United States Patent [19]
Carriveau

[11] 3,928,926
[45] Dec. 30, 1975

[54] SHOW AND TELL APPARATUS

[76] Inventor: Ronald S. Carriveau, 514 W. Turney, Phoenix, Ariz. 85013

[22] Filed: Jan. 29, 1975

[21] Appl. No.: 545,176

[52] U.S. Cl. .................................. 35/76; 40/86 R
[51] Int. Cl.² ........................................ G09B 1/24
[58] Field of Search ........ 35/76, 9 F; 40/86 R, 86 A

[56] References Cited
UNITED STATES PATENTS

| | | | |
|---|---|---|---|
| 1,237,161 | 8/1917 | Bowen | 40/86 |
| 1,384,293 | 7/1921 | Zieba | 40/86 R |
| 1,708,479 | 4/1929 | Macdonald | 40/86 R |
| 2,086,728 | 7/1937 | Morrow | 40/86 R X |
| 2,163,523 | 6/1939 | Whitmyre | 40/86 R |
| 2,546,789 | 3/1951 | Schielke | 35/76 X |
| 3,212,199 | 10/1965 | Clark | 35/9 F |

Primary Examiner—Harland S. Skogquist
Attorney, Agent, or Firm—H. Gordon Shields

[57] ABSTRACT

Show and tell apparatus is disclosed in which two adjacent surfaces are presented, one on which writing, drawing or the like may be made and the adjacent surface on which the drawing, writing, or the like may be displayed and discussed. The apparatus includes "take down" capability.

3 Claims, 6 Drawing Figures

SHOW AND TELL APPARATUS

BACKGROUND OF THE INVENTION

1. Field of the Invention:

This invention relates to creative writing and drawing apparatus, and more particularly, to apparatus in which creative writing and drawing may be made on one surface and may be displayed on an adjacent surface.

2. Description of the Prior Art:

Creative writing and drawing apparatus of the prior art have included apparatus generally having a fixed configuration with the material on which writing or drawing is to be made, or is made, being displayed only on a single surface or on a single surface having a pair of apertures or the like. The material usually included such so-called "teaching machines" that presented a question in a window at one location on one side of the machine, and then the answer was presented at another window or opening on the same side as the question appeared. Other types of machines or apparatus have included a single surface at which writing or drawing may be included from a continuous roll of material.

Other apparatus of the prior art has included simply windows or areas which may be used for displaying various information, without the ability to change the information, as by an endless roll, or even a roll of limited length. Typically, the paper or other medium on which writing or drawing is to be accomplished is moved from one roll onto another roll, and a portion of the roll is displayed at a window or opening. When the takeup roll is advanced, the drawing or writing is then not displayed again but rather is wound about the takeup roll so that a fresh or clean portion of the paper from the supply roll is presented at the opening or window.

If a viewer is to look at what has been drawn or written, it is necesssary that either one of two things take place in the prior art situations. Either the viewer must take the same position as the one who is drawing or writing on the paper or the apparatus in which the writing or drawing is made must be moved or changed in orientation so as to be visible by a viewer. Moreover, a sequential treatment of the information is not available. That is, the writer or user does not have the ability to move the information to a different section of the apparatus in which the information will still be available for viewing while the new information is placed on the medium.

SUMMARY OF THE INVENTION

The invention described and claimed herein is show and tell apparatus in which writing may be placed on a medium on one plane of the apparatus and the medium may then be rolled from a supply reel onto a takeup reel and have the information displayed again on a portion of the medium adjacent that in which it was originally placed which allows the user of the apparatus to place the information on the medium on one location and to describe and tell about the information while the information is displayed at a different location. The apparatus may be easily taken apart for storing, transporting, or the like, and may be assembled easily and speedily and secured together only by the component parts without the addition of extra or permanent fastening means.

Among the objects of the present invention are the following:

to provide new and useful educational apparatus;

to provide new and useful educational apparatus for placing information thereon;

to provide new and useful apparatus for preparing information and for displaying information;

to provide new and useful apparatus for creating and conveying information which is easily assembled and disassembled;

to provide new and useful apparatus including a medium for displaying information in which the medium is used from a supply roll to a takeup roll; and to provide new and useful information apparatus for moving a medium capable of being marked on at one portion of the apparatus and displaying the information marked on the medium at an adjacent location of the apparatus.

DESCRIPTION OF THE PREFERRED EMBODIMENT

Figure 1:
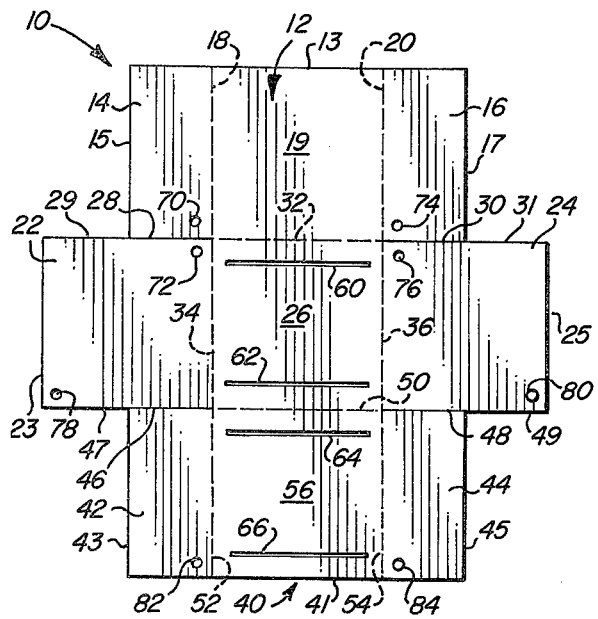
FIG. 1 is a plan view of a portion of the apparatus of the present invention in the disassembled state.

FIG. 1 is a plan view of a portion of the apparatus of the present invention, comprising the container for the apparatus in the flat, disassembled state. The container is preferably comprised of a flat, cardboard sheet 10 of the configuration shown in FIG. 1, which is a generally rectangular configuration with a pair of opposing extensions extending outwardly from the center of the longer sides of the sheet. In FIG. 1 where the sheet is to be folded, the folds are represented by dotted lines, and where the sheet is to be cut, the cuts are represented by solid lines.

The sheet 10 is divided into a number of panels, including the back or rear panel 12 which includes an edge 13, and a pair of side portions 14 and 16, with their respective edges 15 and 17. The back or rear panel 12 includes a pair of creases 18 and 20 which are generally parallel to the edges 15 and 17, respectively, and spaced inwardly therefrom. Generally parallel to edge 13 of the back or rear panel 12, and extending inwardly from the edges 15 and 17, respectively, are a pair of cuts 28 and 30. The cuts extend inwardly to creases 18 and 20, respectively. The cuts 28 and 30 terminate at the creases and a crease 32 extends between the two cuts. The cuts 28 and 30 are aligned with the crease 32 and the cuts and the crease are substantially parallel to the edge 13.

The back or rear panel 12 is defined by the edge 13, edges 15 and 17, which are substantially parallel to each other, and the cuts 28 and 30 and the crease 32 therebetween. The back panel is divided into three portions, side portions 14 and 16 and a center portion 19. The side portion 14 is defined by edge 15, crease 18, cut 28, and a portion of edge 13. The side portion 16 is defined by edge 17, crease 20, cut 30, and a portion of edge 13. The center portion 19 is defined by the center portion of edge 13, creases 18, 20, and 32. Creases 18 and 20 terminate at edge 13. The center portion 19 is generally square, and the sides 14 and 16 are generally rectangular, and each is about half the size of the center portion 19.

Spaced inwardly from the juncture of cut 28 and crease 18 is a hole or aperture 70 which extends through the side portion 14. Similarly, there is a hole or aperture 74 spaced apart from the juncture of crease 20 and cut 30 which extends through the side portion 16. The center of the holes are preferably about two inches from the respective creases and cuts.

Adjacent the back or rear panel 12 is a side panel 22, a top panel 26, and a side panel 24. The side panel 22 is generally square in configuration and is defined by cut 28, an edge 29, which is aligned with cut 28, an edge 23, a cut 46, an edge 47, which is aligned with cut 46 and both of which are substantially parallel to cut 28 and edge 29, and a crease 34. The crease 34 is aligned with crease 18 and is substantially a continuation thereof. The side panel 22 is substantially the same size as the center portion 19 of the back or rear panel 12. The edge 23 of the side panel 22 is generally parallel to the edge 15 of the side 14, but is outwardly therefrom since the side panel 22 is larger than the side portion 14 by a factor of 2. That is, the side 14 is about half the size of the side panel 22.

The side panel 22 includes a hole or aperture 72 located inwardly from the juncture of cut 28 and crease 34. The center of the hole 72 is located about 2 inches from the respective cut and crease, which is about the same distance away from the cut 28 and the crease 18/34 as is the hole 70.

Another hole or aperture 78 is located inwardly from the juncture of edges 23 and 47. The center of the hole 78 is located about 2 inches inwardly from the respective edges.

Side panel 24 is substantially a mirror image of side panel 22. It is defined by an outside edge 25, which is substantially parallel to edge 23, cut 30 and an edge 31 which is generally aligned with cut 30, a crease 36, which is a continuation of crease 20, and aligned therewith, and a cut 48 and an edge 49, which cut and edge are generally aligned with each other. Cut 48 is substantially parallel to cut 30, and edge 31 is substantially parallel to edge 49. As with side panel 23, side panel 24 extends outwardly from side portion 16 of the back panel 12. The side panel 24 is substantially square, and is about twice the size of the side portion 16 of the back panel.

A hole or aperture 76 extends through the side panel 24 spaced apart from the juncture of cut 30 and crease 36. The center of the hole is about 2 inches inwardly from the respective cut and crease. Another hole or aperture 80 extends through the side panel 24 inwardly from the juncture of edges 25 and 49, and the center of the hole 80 is located about 2 inches inwardly from the respective edges.

Between the side panels 22 and 24 is a top panel 26, which is generally square in configuration. The top panel 26 is defined by the creases 32, 34, 36, and a crease 50, which is generally parallel to crease 32 and aligned with and between cuts 46 and 48. The creases 34 and 36 are generally parallel to each other.

Extending through the top panel 26 is a pair of slots 60 and 62. The slot 60 is generally parallel to crease 32 and spaced apart from the crease by about 2 inches. The slot 62 is generally parallel to the crease 50, and spaced apart therefrom by about 3 inches, preferably. Both slots extend most of the way across the top panel. For example, if the top panel is about 15 inches square, the slots are preferably centered between the creases 34 and 36 and extend about 13 inches in length.

Extending downwardly from the center portion of the sheet 10, which center portion includes the side panels 22 and 24, and the top panel 26, is a front panel 40. The front panel 40 is substantially a mirror image of the back panel 12 in configuration. The front panel 40 is divided into three portions, a pair of side portions 42 and 44, and a center portion 56 therebetween.

The front panel 40 is defined by the cuts 46 and 48 and crease 50, which extends between the cuts, an edge 41 which is substantially parallel to the cuts and crease, and a pair of edges 43 and 45, which are substantially parallel to each other. Side portion 42 is defined by the cut 46, a portion of edge 41, edge 43, and a crease 52 which is a continuation of creases 18 and 34 and is accordingly aligned therewith. The crease 52 terminates at edge 41.

The side portion 42 includes a hole or aperture 82 extending through the side portion spaced apart from the juncture of crease 52 and edge 41. The center of the hole is spaced apart from the crease and the edge about two inches. Side portion 44 is defined by edge 45, a portion of edge 41, cut 48, and crease 54 which is a continuation of creases 20 and 36 and is accordingly aligned therewith. The crease 54 also terminates at edge 41. Side portion 44 also includes a hole or aperture 84 extending through the panel and spaced apart from the juncture of crease 54 and edge 41. The center of the hole is also preferably about 2 inches from the respective side and edge.

The center portion 56 is defined by the center portion of edge 41, crease 50, which is substantially parallel to the edge 41, and creases 52 and 54, which are substantially parallel to each other. The center portion 56 is substantially square in configuration, and is about twice the size of each of the side portions 42 and 44, which are generally rectangular in configuration. The center portion 56 includes a pair of slots 64 and 66, which are substantially the same as slots 60 and 62 of top panel 26. The slot 64 is parallel to crease 50 and is centered between creases 52 and 54, and extends about the same length as creases 60 and 62. The slot 64 is preferably spaced about 2 inches from the crease 50. Slot 66, parallel to slot 64 and also to edge 41, is spaced apart from edge 41 about 3 inches. All of the slots 60, 62, 64, and 66 extend about the same length, and are generally parallel to each other and spaced apart from the respective creases 34, 36, and 52, 54. The slots are also about the same width, which is sufficient to allow paper to move freely therethrough. The paper will be discussed in detail below.

As is clearly shown in FIG. 1, the creases 18, 34, and 52 are aligned with each other and accordingly are a continuation of each other. The crease 18 terminates at edge 13 while the crease 52 terminates at edge 41. Similarly, creases 20, 36, and 54 are aligned with each other and are a continuation of the same crease. Crease 20 terminates at edge 13 while crease 54 terminates at edge 41. Creases 18/34/52 are parallel to creases 20/36/54. The creases 34 and 36 extend between the creases 32 and 50, and terminate respectively at the junction of crease 32 and cuts 28 and 30 and at the juncture of crease 50 and cuts 46 and 48. Creases 32 and 50 are parallel to each other and extend respectively between cuts 28 and 30 and cuts 46 and 48 at the respective crease and cut junctures.

The center portion 19 of the back panel 12, as discussed above, is generally square in configuration. Similarly, top panel 26 and the center portion 56 of front panel 40 are both generally square in configuration and all are substantially the same size. Similarly, side panels 22 and 24 are square in configuration and are substantially the same size as the other three panels. The side portions 14 and 16 of the back panel 12 are substantially the same size and configuration as the side portions 42 and 44 of the front panel 56. The side portions are about half the size of the square portions.

Figure 2:
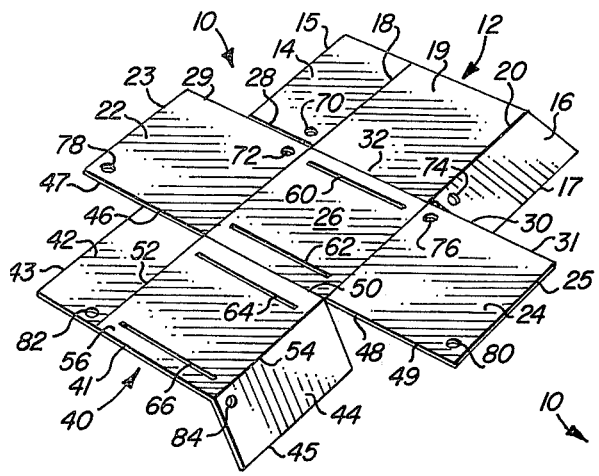
FIG. 2 is an isometric view of the apparatus of FIG. 1 illustrating the beginning of the assembling of the apparatus.

FIG. 2 is a view of the apparatus of FIG. 1 illustrating the beginning of the assembly of the apparatus. In FIG. 1, the sheet 12 is shown in its general configuration, with the appropriate creases and cuts and edges. From the flat sheet, as creased and cut, the container for the show and tell apparatus of the present invention is fabricated. The side portions 14 and 16 are first folded downwardly, as indicated in FIG. 2, along their respective creases 18 and 20. The creases then become folds. The side portions 14 and 16 are folded until they are disposed substantially ninety degrees with respect to the center portion 19 of the back panel 12. Similarly, the side portions 42 and 44 of the front panel 40 are folded along their respective creases 52 and 54, which become folds as the side portions are disposed approximately 90° to the center portion 56 of the front panel.

As the side portions 14 and 16 are folded downwardly and away from the center portion 19 of the front panel, the cuts 28 and 30 separate the side portions from the side panels 22 and 24, respectively. After the folding operation, the cuts become continuations of the respective edges 29 and 31 of the side panels. Similarly, when the side portions 42 and 44 of the front panel 40 are folded downwardly along the creases 52 and 54, respectively, the cuts 46 and 48 become continuations of the edges 47 and 49, respectively, of the side panels 22 and 24.

After the side portions of the rear and front panels are folded downwardly with respect to the center portions of the panels, the center portions of the panels are then folded along their respective creases. For example, front panel 40 is then folded along the crease 50 which separates the front panel 40 from the top panel 46. Similarly, the rear panel 12 is folded along the crease 32 and separates the center portion 19 of the rear panel from the top panel 26.

In FIG. 2, the slots 60, 62, 64, and 66 are shown, and, as mentioned above, when the apparatus is assembled, paper will extend through the respective slots. Also, when the apparatus is assembled, the holes 70 and 72 will be aligned, the holes 74 and 76 will be aligned, and the holes 78 and 82 will be aligned and the holes 80 and 84 will be aligned. This will be discussed in detail below.

Figure 3:
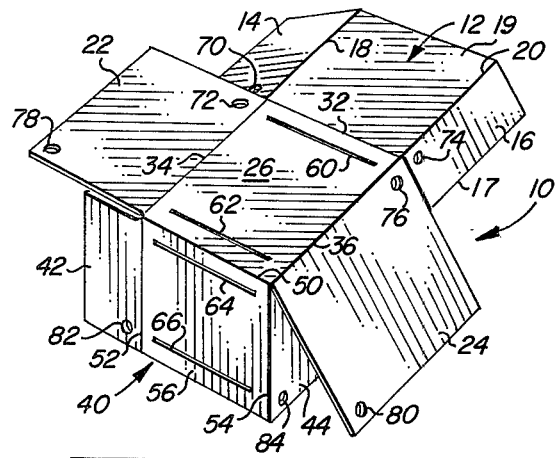
FIG. 3 is an isometric view of the apparatus of the present invention illustrating a step of assembly sequential to that shown in FIG. 2.

FIG. 3 is an isometric view of the continuation of the assembly of the apparatus showing the sequential steps in the assembly of the container continuing the steps illustrated in FIG. 2.

The front panel 40 is shown folded downwardly with respect to the top panel 26 along the crease 50 which divides the center portion 56 of the front panel from the top panel 26. The side portion 44 of the front panel has also been folded along the crease 54 which divides the side portion 44 from the center portion 56 of the front panel.

With respect to the back or rear panel 12, its side portions 14 and 16 are shown folded along the creases 18 and 20 which divide the center portion 19 from the respective side portions 14 and 16. With the side portions 14 and 16 folded along their creases substantially at right angles to the center portion 19, the center portion is folded downwardly along crease 32 which divides the center portion 19 of the back panel 12 from the top panel 26. The center portion 19 of the top panel 12 is then folded downwardly and will be disposed at right angles to the top panel 26. As shown in FIG. 3, the center portion 56 of the front panel 40 is disposed substantially at 90° from the top panel at the crease 50.

With both the rear panel and the front panel folded in position, and both substantially 90° from the top panel, and with the respective side portions of the front and rear panels folded along their respective creases, as discussed above, the edges of the side portions of the front and the back panels will be juxtaposed adjacent each other. That is, referring to FIGS. 1 and 2 in addition to FIG. 3, edge 17 of side portion 16 will be juxtaposed adjacent edge 45 of side portion 44. Similarly, the edges 15 and 43 of the side portions 14 and 42 of the rear panel 12 and the front panel 40 will be juxtaposed adjacent each other when in the assembled position. Since the center portion of the back panel, the center position of the front panel, the top panel, and the side panels are all generally square in configuration and substantially the same size, and since the side portions of the top and front panels are half the size of the square portions, the edges 17 and 45 and 15 and 43 will be disposed adjacent each other and substantially contiguous when the container is in the assembled position.

Referring again to FIG. 3, with the back panel and the front panel folded, and their respective side portions folded appropriately, the side panels 22 and 24 are then folded. In FIG. 3 the side panel 24 is shown folded along the crease 36 which separates the side panel 24 from the top panel 26. The side panel 24, in its folded position, will overlie the side portions 16 and 44. Similarly in the folded position, the side panel 22 will overlie the folded side portions 14 and 24.

The alignment of the respective holes, as discussed above, is partially shown in FIG. 3, in which the hole 80 of the side panel 24 is illustrated as becoming aligned with the hole 84 in the side portion 44. When the rear panel 12 is folded into position, the holes 74 and 76 of the side portion 16 and side panel 24 will be aligned. Similarly, the other holes from the other side portions 14 and 42 and side panel 22 will be aligned.

Figure 4:
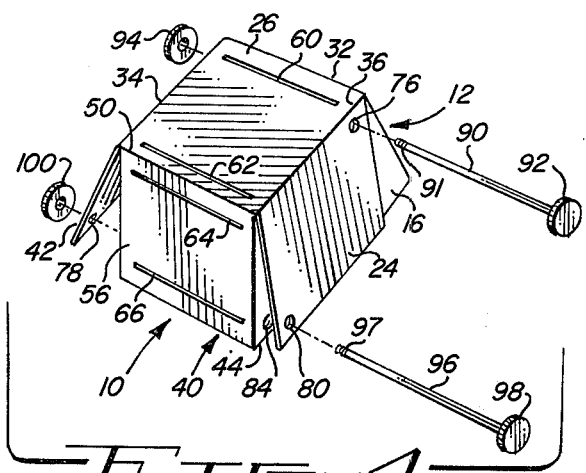
FIG. 4 is an isometric view of the apparatus of the present invention showing the completion of the assembly thereof.

FIG. 4 is a continuing sequence of the assembly of the apparatus of the present invention. The sheet 10 out of which the container is fabricated is identifiable in FIG. 4 as a container with the sides, the back and the front in place, all substantially extending 90°, or about to be extended 90°, with respect to the top 26. The back panel 12 is shown slightly apart from its final position, to show the sequential alignment of its side portion 16 with respect to the side portion 44 of the front panel 40. The front panel 40 is in its final position, with its center portion 56 disposed substantially at 90° to the top panel 26. The side panel 24 is folded along the crease 36 and is spaced apart slightly from its final position against and adjacent the side portions 16 and 44. As clearly illustrated in FIG. 4, the holes 80 and 84 are in substantial alignment. Similarly, hole 76 of the side panel 24 is nearly aligned, and will be aligned when the rear panel 12 is in its final position, substantially at right angles to the top panel 26 and with the center portion of the top panel substantially parallel to the center portion 56 of the front panel 40.

With the side panel 42 in its final position, its holes will also be aligned with the holes in the adjacent end portions of the respective rear and front panels. As illustrated in FIG. 4, the side panel 42 is spaced apart slightly from its final position which will be substantially parallel to the side panel 24. The side panel 42 is shown extending downwardly from its crease 34. The center portion 56 of the front panel 40 is shown in position folded downwardly along crease 50 from the top panel 26 and extending substantially perpendicular thereto.

When the container is substantially in position, the respective holes will be aligned as discussed above. A pair of rods 90 and 96 are inserted through the aligned holes. Rod 90 is inserted through hole 76 and its matching hole 74, and also through hole 70 and its matching hole 72 (see FIGS. 1, 2, and 3). Rod 96 is inserted through matching holes 80 and 84, and through matching holes 82 and 78 (see FIGS. 1, 2, and 3). The rods 90 and 96 become axles about which paper is rolled.

Rod 90 includes an end 91 which is inserted through the holes and a knob 92 which is disposed on the rod opposite from end 91. The knob 92 is securely fastened to the rod 90 and accordingly becomes a knob which is used to rotate the rod or axle when paper is rolled thereon. After the rod 90 is inserted through the matching holes, an end cap 94 is secured to the end 91 outwardly from the side panel 42.

The rod 96 includes an end 97, which is inserted through the matching holes, and a knob 98 oppositely from the end 97. The knob 98 is secured to the rod and is used to rotate the rod or axle when the paper is rolled thereon. When the rod is inserted through the matching and aligned holes, such as holes 80 and 84, and outwardly through holes 82 (see FIGS. 1, 2, and 3) and hole 78, an end cap 100 is secured to the rod at the end 97. Both rods 90 and 96 are slightly longer than the width of the container apparatus, or slightly more than the width of the respective square portions. The rods are each of sufficient length to allow the end caps 94 and 100 to be secured thereto without causing the rods to bind as they are rotated. If desired, the end caps may be large enough to use as knobs to rotate the rods. If such is desired, they must be secured to the rods to prevent relative movement or rotation between the rods and the end caps.

Figure 5:
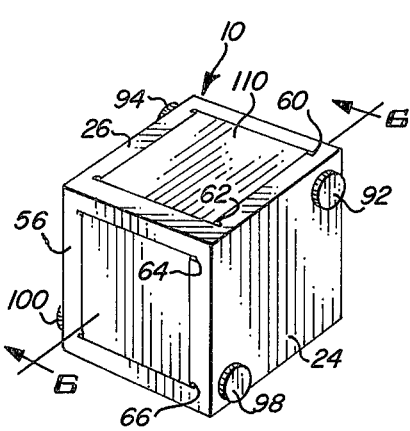
FIG. 5 is an isometric view of the assembled apparatus of the present invention.

FIG. 5 is an isometric view of the assembled apparatus. What started out as a flat sheet 10 in FIG. 1, is now a cube with an open bottom. In order to insert the rods 90 and 96, (see FIG. 4) into the apparatus and to place paper thereon, the apparatus is inverted from the position shown in FIG. 4 and FIG. 5, with the open or bottom end up. Accordingly the top panel 26 is down to provide access for the insertion of paper. As assembled in FIG. 5, paper 110 is shown extending outwardly from slot 60, along the top panel 26, and into slot 62. The paper then emerges through slot 64, is disposed along the front panel 56, and extends into the interior of the apparatus through slot 66. Within the cube, as will be illustrated in FIG. 6, the paper is wound about the rods or axles 90 and 96.

Rotation of knob 92 (or end cap 94) moves the paper in one direction to wind the paper on rod 90 (see FIG. 4). Movement of knob 98 (and/or end cap 100) moves the paper in the opposite direction on rod 96 (see FIG. 4). In the alternative, and perhaps preferably with young children, either knobs 92 and 98 or end caps 94 and 100 may be rotated in opposite directions by a user to move the paper easier than merely moving one knob and/or end cap. The movement of one knob, for instance, will wind the paper on the respective rod to which the rod is secured, while at the same time movement of the opposite knob will serve to unwind the paper from the rod to which the end cap is secured. There is sufficient friction generated by the paper over the edges of the respective slots to keep the paper relatively taut on both the top panel and the end panel of the apparatus.

Figure 6:
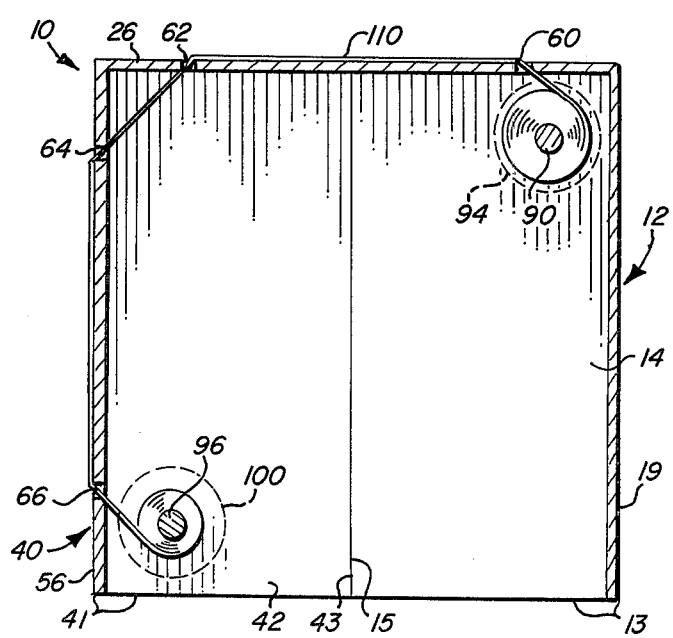
FIG. 6 is a view in partial section of the apparatus of FIG. 5 taken generally along line 6—6 of FIG. 5.

FIG. 6 is a view in partial section of the apparatus of FIG. 5 taken generally along line 6—6 thereof. It shows the apparatus in the fully assembled and operative condition. The container apparatus 10, as indicated above, is now in a generally cubical configuration with an open bottom. The open bottom is used to provide access to the interior of the cube for the insertion of the paper and the securing of the paper to the rods 90 and 96.

As assembled, the container is closed by the center portion 19 of the back panel 12 at the back or rear of the container, and by the center portion 56 of the front panel 40 at the front of the apparatus. The apparatus is disposed on the edges 13 and 41 of the back panel and front panel, respectively. With the side portions of the rear and front panels folded and assembled, the edges 13 and 41 provide the support for the apparatus and it accordingly rests on those edges.

The edges 15 and 43 of the side portions 14 and 42 of the back and front panels, respectively, are juxtaposed adjacent each other when the apparatus is in the assembled state. This feature has been discussed above, and is clearly illustrated in FIG. 6. The edges 13 and 41 are continuous along the rear panel and front panel, respectively, and when the side portions are folded, the edges are accordingly divided into three portions, including a center portion which comprises the edge of the center portion of the respective panels, and a pair of edge portions, disposed substantially perpendicular to the center portion, which in turn are the edge portions of the respective side portions of the panels.

Paper 110 is concentrically wound about rods 90 and 96. The paper extends in a roll about the respective rods and is movable therebetween. The paper moves from its rolled position about rod 90 outwardly from the interior of the container through slot 60, along the top panel 26, and back into the interior of the container through slot 62. From slot 62 the paper extends at an angle across a corner of the interior of the cubicle container to slot 64 where it extends outwardly from the container and along the center portion 56 of the front panel 40. The paper then extends inwardly through slot 66 and is concentrically wound about rod 96. When it is desired to move the paper, as for example, from rod 90 onto rod 96, the rod 90 may be turned counterclockwise, as viewed in FIG. 6, by knob 92 (see FIGS. 4 and 5). At the same time, the rod 96 may be rolled counterclockwise, as viewed in FIG. 6, by rotation of the knob 98 (see FIGS. 4 and 5). To move the paper in the opposite direction, as from rod 96 to rod 90, rotation of the respective rods and knobs is clockwise, as viewed in FIG. 6.

In operation, the apparatus may be assembled as described in detail above, and a user, such as a child, will write or draw on the paper disposed on the top panel 26. When the user has completed drawing on one portion of the top panel, the paper may be advanced from rod 90 onto rod 96, and a continuous sequence of events, drawings, or the like, may be represented on the paper. The user may then rotate the knobs, continuing the winding of the paper from rod 90 onto 96 until the user completes his desired drawing or writing activities. After completing the desired activity, the user may tell or describe that which has been placed on the paper by rotating the respective knobs which causes the writing or drawing to sequentially be viewed on the front panel 40, at the center portion 56. In this manner, the apparatus may be used to show and tell that which has been placed on the paper. The amount of writing or drawing placed on the paper is limited only by the amount of paper placed on the rods. The use of the two viewing portions, the top portion and the front portion, allows the user to write or draw at one location and then to describe what has been written or drawn to another person who views the writings from the front of the apparatus.

The apparatus may be left in its assembled condition, or, for storage, transportation, and the like, may be quickly and easily taken apart and returned to its flat condition, as illustrated in FIG. 1, or it may be folded as desired, for example along creases 32 and 50, with the front panel and the back panel disposed contiguously to each other and to the top panel 26 as opposed to the orientation of the respective panels as in the finished or assembled condition. In the alternative, the apparatus may be folded along the respective continuous folds 18, 34, 52, and 20, 36, 54. In this situation, the side portions of the front and back panels and the side panels will be contiguous with respect to each other and to the center portions of the respective front and back panels and the top panel. In either of the folded conditions, the apparatus may be conveniently stored.

The apparatus is held together securely and simply by the configuration of the apparatus in the assembled condition discussed above, by means of the rods which extend through the respective sides and panels. The knobs and end caps are larger in diameter than are the apertures or holes through which the rods extend, and when securely fastened through the rods, the end caps provide sufficient inward bias against the side panels to hold the apparatus together.

As suggested above, an appropriate size for the cube is about fifteen inches for each edge. This is of sufficient size to allow a child adequate room for drawing or writing and is not too large to allow the child or user to move the apparatus conveniently and easily. Since the container is preferably made of cardboard, the container is not heavy and the assembled apparatus is easily portable by even a relatively small child. In the disassembled state, either flattened or contiguously folded, as described above, the apparatus is still extremely portable and relatively easily transported by a child. Moreover, due to the simplicity of the construction and the inexpensive materials out of which it is fabricated, the entire apparatus is relatively inexpensive, yet very functional for children.

An alternative construction, one slightly more expensive but also more durable, would include fabricating the container out of wood, hardboard, or plastic. In such construction the side portions of the back and front panels would be eliminated, and the folds or creases about the periphery of the top panel would be cuts. That is, the side panels, top panel, and the center portions of the back and front panels would each be separate pieces, preferably hinged together to comprise a five sided cube with one open side, the bottom. Adjacent sides would be appropriately fastened together in addition to the rods.

If desired, the container may be fabricated of the materials discussed in the preceding paragraph and in the configuration shown in FIGS. 1–6, with hinged connections replacing the creases and folds discussed in conjunction with the figures. In such configuration the rods would be employed to secure the apparatus together, as discussed, without requiring other fasteners than the hinges connecting the panels and sides. If the take down feature is not desired, the five panels may be permanently secured together by appropriate means. In such configuration, the rods function only to hold and move the paper or other medium.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operating requirements, without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Apparatus for writing and displaying on adjacent sides, comprising, in combination:
    a first and second panel connected to each other and disposed substantially perpendicular to each other;
    a pair of side panels generally parallel to each other and each disposed substantially perpendicular to the first and second panels and connected thereto;
    a back panel connected to the first panel and the side panels and disposed generally parallel to the second panel, said first and second panels, back panel, and side panels defining a hollow container;
    a first slot and a second slot generally parallel to each other in the first panel;
    a first slot and a second slot generally parallel to each other in the second panel and disposed generally parallel to the slots in the first panel;
    a pair of first holes, one in each of the side panels, aligned with each other and disposed adjacent the first slot in the first panel;
    a pair of second holes, one in each of the side panels, aligned with each other and disposed adjacent the second slot in the second panel;
    a first rod extending through the first holes in the side panels;
    a second rod extending through the second holes in the side panels; and
    a medium for writing and drawing wound about the first rod within the container and extending outwardly through the first slot on the first panel, inwardly through the second slot on the first panel, outwardly through the first slot on the second panel, inwardly through the second slot on the second panel, and wound about the second rod.

2. The apparatus of claim 1 in which the first and second rods are rotatable to move the medium wound thereon over the first and second panels.

3. The apparatus of claim 2 in which the second panel, the side panels, and the back panel are each secured to the first panel.

* * * * *